US009510428B2

(12) United States Patent  (10) Patent No.: US 9,510,428 B2
Mix et al.  (45) Date of Patent: Nov. 29, 2016

(54) ZERO POWER LIGHTING CONTROL DEVICE AND METHOD

(75) Inventors: Steven Mix, Cupertino, CA (US); Tho Phan, San Jose, CA (US); Louia Weidman, Oceanside, CA (US); Thomas Grey, San Marcos, CA (US)

(73) Assignee: The Watt Stopper, Inc., Carlsbad, CA (US)

( * ) Notice: Subject to any disclaimer, the term of this patent is extended or adjusted under 35 U.S.C. 154(b) by 643 days.

(21) Appl. No.: 12/806,427

(22) Filed: Aug. 11, 2010

(65) Prior Publication Data

US 2011/0037417 A1 Feb. 17, 2011

Related U.S. Application Data

(60) Provisional application No. 61/274,160, filed on Aug. 13, 2009.

(51) Int. Cl.
*H05B 37/02* (2006.01)

(52) U.S. Cl.
CPC ...... *H05B 37/0227* (2013.01); *H05B 37/0281* (2013.01); *Y02B 20/42* (2013.01); *Y02B 20/44* (2013.01)

(58) Field of Classification Search
CPC .......... H05B 37/0272; H05B 37/0227; H05B 33/0854; H05B 37/0218; H05B 33/0803; H05B 37/02; H05B 33/0845; H05B 33/0842; H05B 37/0281; H05B 33/0815; H05B 33/0851; F21V 23/0442; F21V 23/0471
USPC ....... 315/362, 294, 312–313, 295, 308, 291, 315/219, 159, 154, 360, 307, 158, 361
See application file for complete search history.

(56) References Cited

U.S. PATENT DOCUMENTS

| 5,446,253 | A |   | 8/1995  | Oshgan    | 200/556 |
|-----------|---|---|---------|-----------|---------|
| 5,486,669 | A |   | 1/1996  | Oshgan    | 200/556 |
| 5,498,931 | A | * | 3/1996  | Bedocs    | H05B 37/0227 250/214 R |
| 5,598,042 | A | * | 1/1997  | Mix       | H05B 37/02 307/112 |
| 5,726,629 | A | * | 3/1998  | Yu        | 340/565 |
| 5,753,983 | A | * | 5/1998  | Dickie    | G05D 25/02 307/125 |
| 5,831,391 | A | * | 11/1998 | MacKay    | H05B 37/0227 250/342 |
| 5,844,516 | A |   | 12/1998 | Viljanen  | 341/173 |
| RE37,135  | E | * | 4/2001  | Elwell    | 315/154 |
| 6,448,880 | B2|   | 9/2002  | Yu        | 337/66 |
| 6,797,905 | B1|   | 9/2004  | Wang et al. | 200/339 |
| 6,888,323 | B1|   | 5/2005  | Null et al. | 315/294 |
| 7,079,027 | B2| * | 7/2006  | Wojcik    | A01M 31/002 340/539.26 |
| 7,122,976 | B1|   | 10/2006 | Null et al. | 315/362 |
| 7,277,012 | B2| * | 10/2007 | Johnston  | G08B 13/1618 340/541 |
| 7,405,524 | B2|   | 7/2008  | Null et al. | 315/308 |
| 7,791,282 | B2| * | 9/2010  | Yu et al. | 315/209 R |
| 8,018,166 | B2| * | 9/2011  | Soccoli et al. | 315/129 |
| 8,077,035 | B2| * | 12/2011 | Reid et al. | 340/565 |

(Continued)

*Primary Examiner* — Crystal L Hammond
(74) *Attorney, Agent, or Firm* — K. David Crockett, Esq.; Paul J. Backofen, Esq.; Crockett & Crockett, PC

(57) ABSTRACT

The present invention is directed to a lighting control system with a motion sensor unit that electrically couples to a load circuit through a latching relay or load controller for turning on and off lights. The motion sensor unit is configured to power down to draw zero power after a time delay, when motion is longer detected within the work space by the motion sensor unit. The lighting control system further includes a control circuit that reinitiates or turns the motion sensor back on through a switch device.

20 Claims, 4 Drawing Sheets

(56) References Cited

U.S. PATENT DOCUMENTS

| | | | |
|---|---|---|---|
| 2003/0047671 A1* | 3/2003 | Hironaka | G08B 13/191 250/221 |
| 2004/0130905 A1* | 7/2004 | Olds et al. | 362/487 |
| 2005/0121602 A1* | 6/2005 | Peng | H03K 17/941 250/221 |
| 2007/0029949 A1* | 2/2007 | Null et al. | 315/308 |
| 2007/0153524 A1* | 7/2007 | Lee | 362/276 |
| 2007/0273307 A1* | 11/2007 | Westrick et al. | 315/312 |
| 2007/0273500 A1* | 11/2007 | Chiu | 340/522 |
| 2008/0111498 A1* | 5/2008 | Budike | H05B 37/0272 315/291 |
| 2011/0012433 A1* | 1/2011 | Parsons | H05B 37/0227 307/117 |
| 2011/0074225 A1* | 3/2011 | Delnoij | H05B 37/0227 307/117 |
| 2011/0254381 A1* | 10/2011 | Gramlich | B60D 1/62 307/117 |

* cited by examiner

ZERO POWER LIGHTING CONTROL DEVICE AND METHOD

RELATED APPLICATION

This patent application claims priority under 35 U.S.C. 119 (e) of the U.S. Provisional Patent Application Ser. No. 61/274,160, filed Aug. 13, 2009, and titled "ZERO POWER LIGHTING CONTROL DEVICE AND METHOD". The U.S. Provisional Patent Application Ser. No. 61/274,160, filed Aug. 13, 2009, and titled "ZERO POWER LIGHTING CONTROL DEVICE AND METHOD" is hereby incorporated by reference.

FIELD OF THE INVENTION

This invention relates to motion sensors. More specifically, this invention relates to controlling power consumption of loads using motion sensors.

BACKGROUND

Lighting control devices incorporating sensors for estimating occupancy or vacancy are well known in the art. An example of such a device is a Watt Stopper WS-250 Passive Infrared Wall Switch Sensor (Watt Stopper, Santa Clara, Calif.), having both a load control device and a pyroelectric sensor in the same housing. Such devices typically use infrared and/or ultrasonic sensors that, when coupled with suitable signal conditioning and processing, are useful to detect signal changes that may indicate human motion in a space for estimating occupancy or vacancy. Typically, this sensed motion is used to control the on/off condition of a load, such as a light or air conditioner.

A load control system, for example, includes one or more load control devices (relays), that physically turn load circuits on and off, and one or more motion sensors. The motions sensors generate signals indicative of motion to the load control devices for the purpose of controlling the load circuits based on motion detected within a work space.

A lighting control devices and/or systems are often configured to turn on lights when motion is first sensed, and then turn off lights after a time delay that motion is no longer detected. This provides the benefits of conserving energy when the work space is unoccupied.

SUMMARY

Prior art lighting control devices and systems continuously draw current from load circuits to power the load controllers, motion sensors and other circuitry even when the load circuits are open and lights are turned off. The present invention is directed to a lighting control system with a motion sensor unit that electrically couples to a load circuit through a latch relay or load controller for turning lights on and off. The motion sensor unit of the present is configured to power the motion sensor unit down to draw zero power after a time delay, when motion is longer detected within a work space by the motion sensor unit. The lighting control system further includes a control circuit that reinitiates or turns the motion sensor back on through a switch device. In accordance with the embodiment of the invention the control circuit for reset action is built into the switch device, which is a periphery switch device. Alternatively, the control circuit and switch device are built into the motion sensor unit. In accordance with the embodiments of the invention, the motion sensor unit is also configured to draw zero power after the load circuit is manually or automatically shut off through the switch device.

The motion sensor unit of the present invention includes one or more sensors and a sensor circuit. The one or more sensors include, for example, ultrasonic sensors, infrared sensor, image recognition sensors (CCD cameras), acoustic sensor, and/or mechanical sensing devices, such as pressure matts. In accordance with the embodiments of the invention the sensor unit employs dual sensor technology, which, for example, utilizes and infrared sensor and an ultrasonic sensor and/or hyper-frequency sensing technology. Regardless, the one or more sensors detect motion and/or occupancy. In operation, the one or more sensors detect motion or occupancy within a work space and the sensor unit generates control signals based on the motion and/or occupancy that is detected. The control signals are received by a sensor circuit and the sensor circuit instructs the latch relay or load controller to control the load circuits based on the detected motion or detected occupancy. When the level of motion and/or occupancy that is detected by sensor unit is below threshold value, the control signals processed by the sensor circuit instruct the load controller to open the load circuit and shut off lights after the first time delay. After the first time delay and after the load circuit is opened, the motion sensor unit draws zero current.

In accordance with the embodiments of the invention the load is closed, the lights are turned back on manually or automatically with a switch device, such as described above. The switch device is a motion sensor, or a periphery switch device. The periphery switch device is, for example, a manual momentary wall switch, a mechanical sensor or a motion sensor, such as a wall switch motion sensor. Further, details of wall switch motion sensors are provides in U.S. Pat. Nos. 6,888,323, 7,122,976 and 7,374,057, the contents of which are hereby incorporated by reference.

As described above, when the switch device is activated to close the load circuit and turn the lights on, the motions sensor unit is powered back on. The control circuit then senses that the load switch has been closed and powers the motion sensor back on, such that the motion sensor unit operates in the manner described above.

The control circuit for reset action, for example, includes a current limiting resistor electrically coupled to a switch device, such as two momentary contact push buttons (ON and OFF each connected to a zener diode and capacitor. A zener diode and capacitor serve to reduce the voltage to that needed by a latching relay (load controller). The Push buttons send voltages to the two corresponding states of, "close" and "open", of the Latching Relay.

In further embodiments of the invention the control circuit for reset action includes a rectifier bridge electrically couple to ganged-pairs of switches for the on/off function. The rectifier bridge allowing both the positive and negative cycles of the line waveform to power a latching relay load controller.

In further embodiments of the invention the motion sensor system include any number of motion sensor units, load controllers, switch devices and control circuits for controlling any number of load circuits. In further embodiments of the invention, motion sensor units and/or switch devices are powered by a back up battery, such that they continue to draw zero current with the corresponding load circuits, with the load circuits in an open position and with the corresponding lights off.

DETAILED DESCRIPTION

Figure 1:
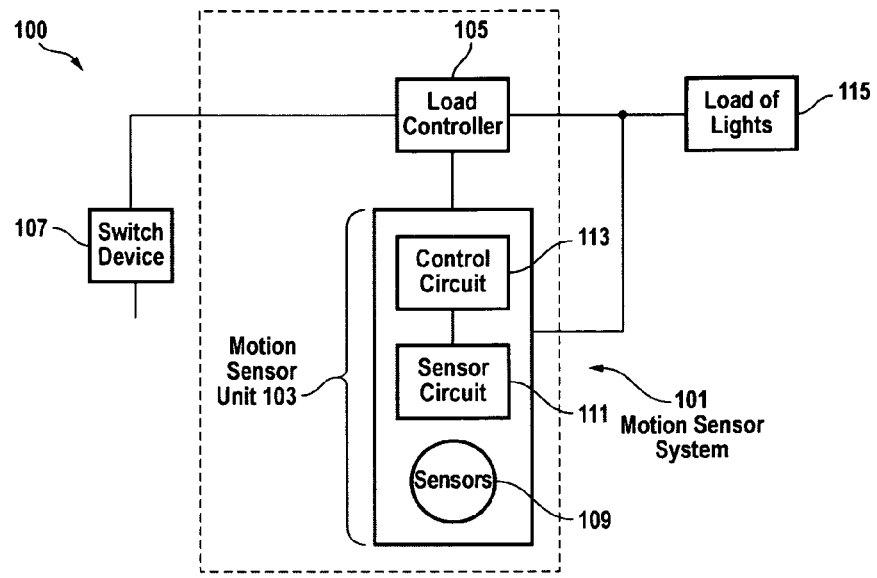
FIG. 1 shows a schematic representation of a zero power lighting control system, in accordance with the embodiments of the invention.

FIG. 1 shows a representation of a zero power lighting control system 100, in accordance with the embodiments of the invention. The lighting control system 100 includes a motion sensor system 101 with a motion sensor unit 103. The motion sensor unit 103 includes a control circuit 113 that is configured to power the motion sensor unit 103 down to draw zero power after a first time delay, when motion is no longer detected within the work space by the motion sensor unit 103. The zero power lighting control system 100 further includes a control circuit, such as described with reference to FIGS. 3A-C below, that reinitiate or turn the motion sensor unit 103 back on through a switch device 107. In accordance with the embodiments of the invention, the motion sensor unit 103 is also configured to draw zero power after the load circuit is manually or automatically shut off through the switch device 107.

Still referring to FIG. 1, motion sensor unit 103 of the present invention includes one or more sensors 109 and a sensor circuit 111. The one or more sensors 109 include, for example, ultrasonic sensors, infrared sensor, image recognition sensors (CCD cameras), and/or mechanical sensing devices, such as pressure mats. The one or more sensors 109 detect motion and/or occupancy in a work space. In operation, when the one or more sensors 109 detect motion or occupancy within the work space, the sensor unit 101 generates control signals based on the motion and/or occupancy that is detected. The control signals are received by the control circuit 113 and the control circuit 113 instructs the latch relay or load controller 105 to control the load circuits based on the detected motion or detected occupancy within the work space. When the level of motion and/or occupancy that is detected by sensor unit 103 is below threshold value, the sensor circuit 111 sends control signals to the control circuit 113 which are processed to instruct the latch relay or load controller 105 to open the load circuit and shut off lights 115 after the first time delay. After the first time delay and after the load circuit is opened, the motion sensor unit 103 draws zero current.

In accordance with the embodiments of the invention, the load is closed and the lights are turned back on with the manually or automatically with a switch device 107, such as described above. The switch device 107 is a switch device on the motion sensor unit 103, or alternatively is a periphery switch device. A periphery switch device is, for example, a manual momentary wall switch, a mechanical sensor or a motion sensor, such as a wall switch motion sensor. Further, details of wall switch motion sensors are provides in U.S. Pat. Nos. 6,888,323, 7,122,976 and 7,374,057, the contents of which are hereby incorporated by reference.

As described above, when the switch device 107 is activated to close the load circuit and turn the lights 115 on, the motions sensor unit 103 is powered back on by a control circuit, described with reference to FIGS. 3A-C. The control circuit then senses that the load circuit has been closed and powers the motion sensor unit 101 back on, such that the motion sensor unit operates in the manner described above. In accordance with the embodiment of the invention, the control circuit is built into the switch device 107, built into the motion sensor unit 103 or alternatively is separate for the switch device or the motion sensor unit 103.

Figure 2:
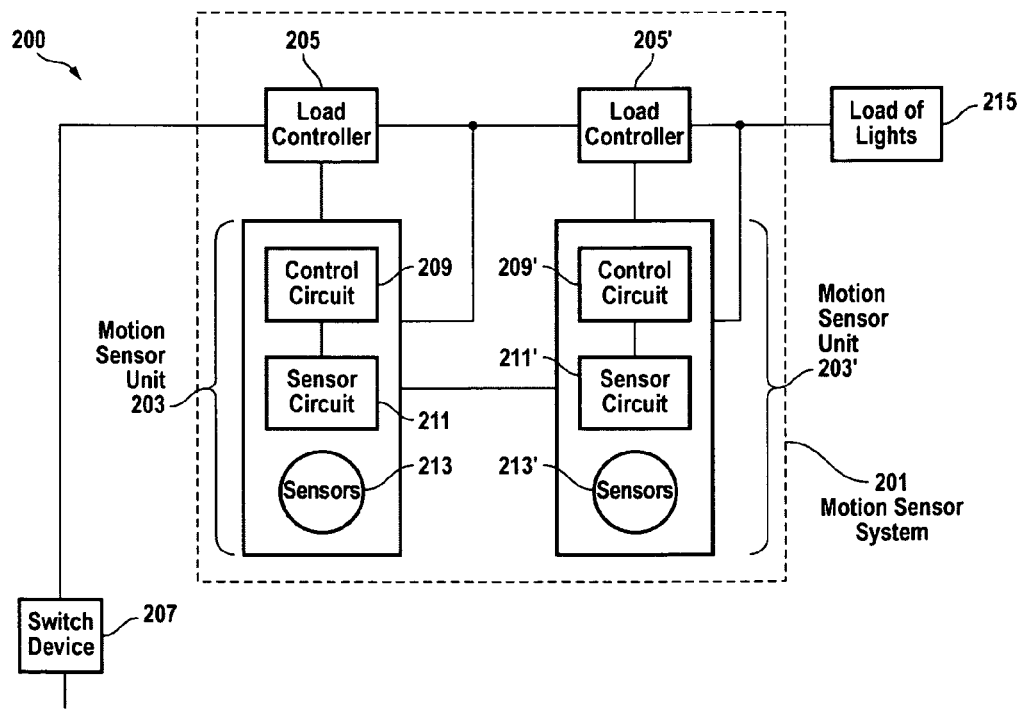
FIG. 2 shows a schematic representation of a zero power lighting control system, in accordance with an alternative embodiment of the invention.

Now referring to FIG. 2, in accordance with the embodiments of the invention, a zero power lighting control system 200 includes a motion sensor system 201 with a plurality of motion sensor units 203 and 203'. The motion sensor units 203 and 203' include control circuits 209 and 209' that is configured to power the motion sensor units 203 and 203' down to draw zero power after a first time delay, when motion is no longer detected within work spaces by the motion sensor units 203 and 203'. The zero power lighting control system 200 further includes a control circuit, such as described with reference to FIGS. 3A-C below, that reinitiate or turn the motion sensor units 203 and 203' back on through a switch device 207. As described above, the motion sensor units 203 and 203' are configured to draw zero power after the load circuit is manually or automatically shut off through the switch device 207. It will be clear from the description above and below that a zero power lighting control system 200 can include any number of motion sensor units configured to operate any number of load circuits through a single switch device or multiple switch devices.

The motion sensor units 203 and 203' include sensors 213 and 213' and a sensor circuits 211 and 211', such as described above. The sensors 213 and 213' detect motion and/or occupancy in a work space and the sensor circuits 211 and 211' generate control signals that are processed by the control circuits 209 and 209'. The control circuits 209 and 209' then instruct corresponding latch relays or load controllers 205 and 205' to control one or more load circuits based on the motion and/or occupancy that is detected. When the motion and/or occupancy that is detected by the motion sensor system 201 within work spaces is below a threshold value the one or both of the motion sensor units close one or more corresponding load circuits to shut off lights 215 and the motion sensor units 203 and 203' power down to draw zero current.

Still referring to FIG. 2 the switch device 207 is used to manually or automatically close the load circuit and turn the lights 215 and power back on the motion sensor units 203 and 203' by a control circuit, such as described above and below. FIGS. 3A-C will now be used to further describe detail of the electrical circuitry of a zero power lighting control system including the reset operations of the control circuits.

Figure 3A:
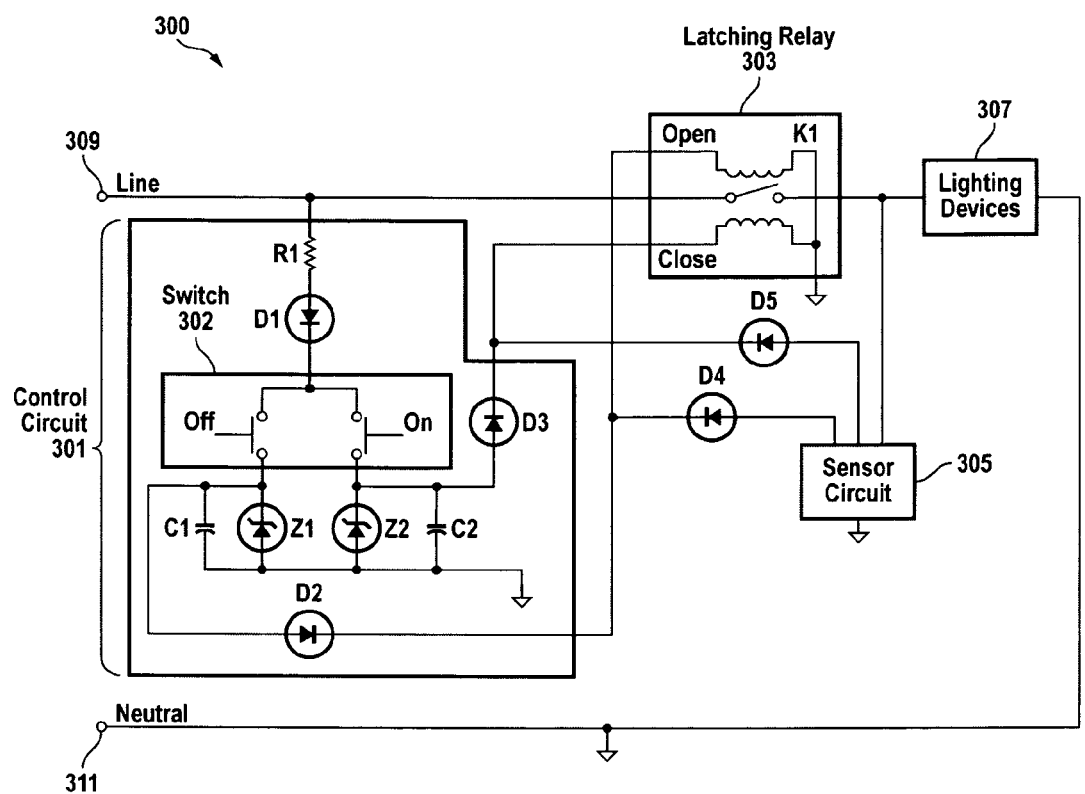
FIG. 3A shows a schematic representation of the electrical circuit design for a zero power lighting control system, in accordance with the embodiments of the invention.

FIG. 3A shows a schematic representation of the electrical circuit design for a zero power lighting control system 300, in accordance with the embodiments of the invention. Single phase mains voltage having line 309 and neutral 311 wire connections is used to supply power. The Line 309 voltage is connected to a control circuit 301 through a switch device 302. The switch device 302 includes two momentary contact push buttons ON and OFF. The control circuit 301 is electrically coupled to and to a latching relay circuit that includes dual coil single latching relay 303. A current limiting resistor R1 and rectifying diode D1 are placed between Line 309 and the switch device 302. Upon pressing the ON button, rectified line voltage is applied to the zener diode Z2 and capacitor C2, which both serve to reduce the voltage to that needed by the latching relay 303, such as 12V. This voltage is applied to the "close" input of the latching relay 303, thereby causing the relay contact to close, which causes Line 309 voltage to connect to both the Load 307 and the sensor circuit 305. The activation of the latching relay 303 generally happens very quickly so that the user can release the ON button relatively quickly. For example, the latching relay 303 will typically close within 10-15 milliseconds. The latching relay 303 will then stay in its closed state without power being applied to the "close" input. Correspondingly, the user may press the OFF button, causing rectified line 309 voltage to be applied to zener diode Z1 and capacitor C1, which then apply a suitable voltage to the "open" input of the latching relay 303. This causes the latching relay 303 to open and disrupt the LINE 309 voltage applied to the Load and the sensor circuit 305. In this embodiment, if either switch device 302 is pressed for a length of time, significant current may flow through the coil or the latching relay 303. Accordingly, in an alternative embodiment, the zero power lighting control system 300 includes a current limiting circuit that limits the current beyond that necessary to activate the relay coil of the latching relay 303.

A sensor circuit 305, in accordance with the embodiments of the invention is coupled to a motion sensor based on a pyroelectric infrared (PIR) sensor (not shown). The motion sensor circuitry may include circuitry necessary to convert LINE 309 voltage to smaller direct current voltages useable by its internal circuitry or this direct current voltage may be supplied by a separate power supply circuit. Composition of the motion sensor circuitry is not critical to the invention and numerous design options may be found in the art, including ultrasonic motion sensors, combination ultrasonic and PIR motion sensors, occupancy or vacancy sensors based on audible sound or image processing, etc. The motion sensor circuitry monitors motion in the room. If motion is periodically detected, the load is not modified, or a relay closing voltage may be re-applied by the sensor circuit 305 through diode D5 as a result of motion or at other times as needed. If motion is not detected for a predetermined period of time, the motion sensor circuitry applies a suitable voltage to the "open" input of the latching relay 303 through a diode D4, causing the relay contacts of the latching relay 303 to open. This disconnects power to both the load 307 and to the motion sensor/load control circuitry. The predetermined period of time may be fixed into the device, may be selectable by the user using a suitable method, such as a slide switch array (not shown), or be automatically adjustable using information about vacancy and/or occupancy patterns. Since the relay 303 is preferably a "latching type" relay, when the relay 303 is opened no power is consumed in any part of the zero power lighting control system 300 and a higher level of energy conservation is achieved.

In an alternative embodiment to that shown in FIG. 3A, the diode D5 connected between the sensor circuit 305 and the "close" input of the latching relay 303 and the motion sensor is configured to implement a warning to the user that the load is about to turn off. The sensor circuit 305, for example, includes internal circuitry with a large value capacitor and very low power components that allow the sensor circuit 305 to remain in the "On" condition for a brief period of time, for example, 3-5 seconds, when main power is disconnected. This allows the sensor circuit 305 to turn off the load as described above disabling power to the sensor. With power disabled to the sensor, the sensor circuit remains "active" to turn power back on after a brief period of time, such as 1 second, by applying a suitable voltage back to the "close" input of the latching relay 303. This allows the zero power lighting control system 300 to implement a "blink-warn" feature in which the load is briefly interrupted to warn an occupant that the load is about to shut off. If the a work space is still occupied, then the occupant of the work space can move to retrigger the motion sensor so that the load will not be shut off. However, if the work space is unoccupied, the zero power lighting control system 300 will then open the load, turn off the lights 307 and power down to draw zero current, such s described above.

Figure 3B:
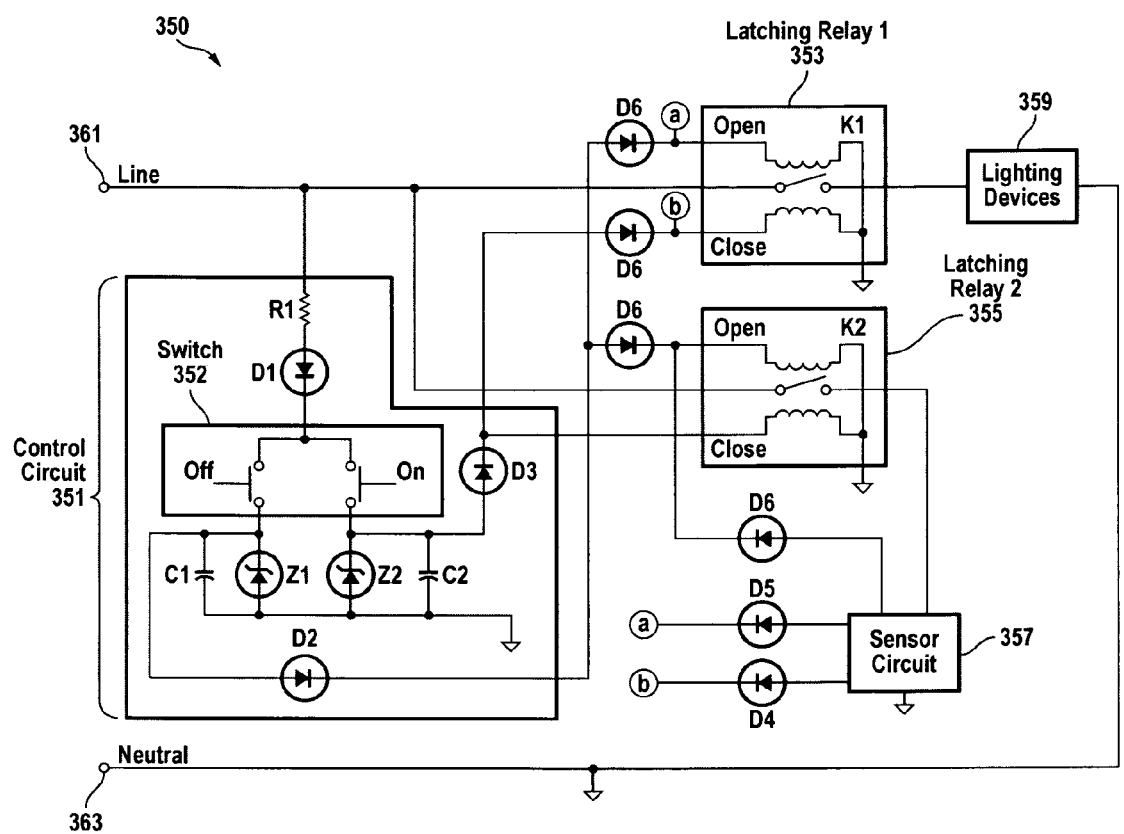
FIG. 3B shows a schematic representation of the electrical circuit design for a zero power lighting control system, in accordance with further embodiments of the invention.

FIG. 3B, shows a schematic representation of the electrical circuit design for a zero power lighting control system 350, in accordance with an alternative embodiment of the invention. The zero power lighting control system 350, includes a control circuit 351. The line 361 and neutral 363 are used to supply power in terms of a single phase voltage. The control circuit includes a current limiting resistor R1 and rectifying diode D1 placed between line 361 and the push button switches "On" and "Off" of a switch device 352. The "On" and "Off" contacts of the switch device 352 are electrically coupled to a pair of capacitors and Zener Diodes, C2, Z2 and C1, Z1 respectively. The output from the "On" contacts of the switch device 352 are electrically coupled to Diode D3 which is connected to the "Close" input of a first latching relay 353 and second latching relay 355.

Similarly, the outputs from the "Off" contacts of the switch device 352 are connected to Diode D2 which is connected to the "Open" input of the first latching relay 353 and second latching relay 355.

In accordance with this embodiment of the invention the first latching relay 353 controls the application of line 361 voltage to the load and the second latching relay 355 controls application of the line 361 voltage to the sensor circuit 357. Because the second latching relay 355 is not handling load currents, the second latching relay 355 alternatively is replaced with any other suitable latching circuits, such as a latching transistor circuit. In accordance with this embodiment of the invention an ON button of a switch device applies voltage to close both the first latching relay 353 and the second latching relay 355, thereby turning on both the load 359 and the sensor circuit 357. In operation OFF button of the switch device 352 also turns power off to both the load 359 and sensor circuit 357 by opening first latching relay 353 and the second latching relay 355. The sensor circuit 357 is configured to turn the load 359 on and off through the first latching relay 353 and the second latching relay 355 via diodes D4 and D5. Further, the first latching relay 353 and the second latching relay 355 are disable via diode D6. This allows the sensor circuit 357 to turn lights 359 on/off automatically during the day when motion is detected by a sensor (no shown) of the motion sensor circuit, by implementing what is referred to as "automatic-on, automatic-off" functionality. The sensor circuit 357 is configured to be turned off by the last person leaving a work space by pressing the OFF button of the switch device 352. Alternatively, the sensor circuit 357 turns itself off based on input from an external timer or internal timer circuitry, wherein the sensor circuit 357 draws zero current at a set time of the day or after a set delay time after motion detected by the sensor of the sensor circuit 357 is below a threshold value.

Figure 3C:
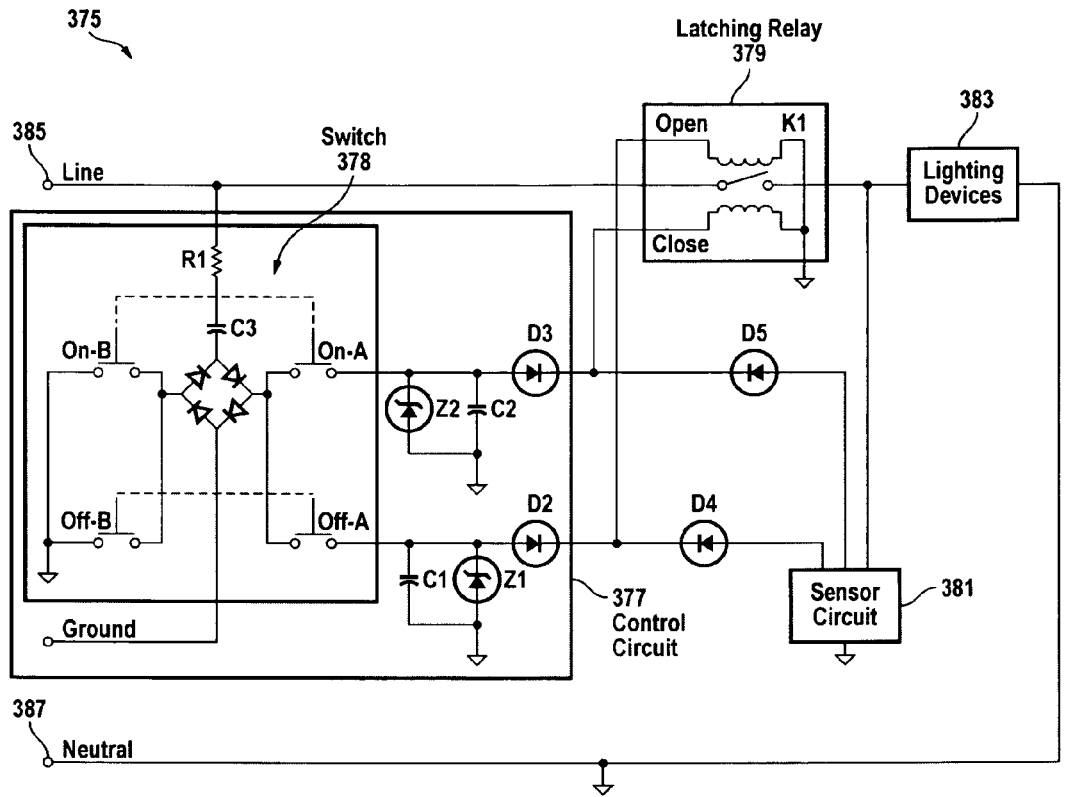
FIG. 3C shows a schematic representation of the electrical design for a zero power lighting control system, in accordance with yet further embodiments of the invention.

FIG. 3C shows a schematic representation of the electrical design for a zero power lighting control system 375, in accordance with yet further embodiments of the invention. As described above zero power lighting control system 375 includes a control circuit 377, electrically coupled to a switch device 378, a sensor circuit 381 with a sensor, a latching relay 379 electrically coupled to a load for controlling lights 383. The switch device 378 includes a rectifier bridge RT1 and ganged-pairs of switches for providing "On" and "Off" functions. The Rectifier RT1 allows both the positive and negative cycles of the line 385 voltage waveform to power the latching relay 379, where as the embodiment described with reference to FIG. 3A provides only a positive cycle of the line 385 voltage waveform to power the a latching relay. In operation the On-A and On-B contact of the switch device 378 close simultaneously. Positive power flows from LINE through R1 and RT1 and On-A to bias diode Z2 to its voltage, thereby clamping the voltage to that needed to activate the CLOSE side of latching relay 379. Power is returned through the reference connections to On-B, RT1 and GROUND. If the On contacts are engaged through the switch device 378 during the negative part of the power cycle, power would flow from GROUND through RT1 and On-A, bias diode Z2, flow through the CLOSE side of latching relay 379, through the reference connections to On-B, RT1 and then through R1 to LINE. The Off functions of the switch device 378 works in a similar fashion. In yet further embodiments of the invention transistor circuits are added to the switch device 378 to interrupt the on and off contacts when the latching relay 379 has changed state, thereby reducing power consumption in the event that the on or off contacts of the switch device 378 become engaged continuously by accident.

It will be clear form the description above, that suitable switch devices include push buttons, toggle switches or any other suitable switch mechanism to activate the "On" and "Off" function of the zero power lighting control system 375. Where a single push button is implemented, the push button still activates the latching relay 379 to turn on both the load 383 and sensor circuit 381 and also activates a control circuit 377 circuit. While this approach may increase cost, it provides the capability to implement various single button command strategies such as tap, tap-multiple, push-and-hold, etc., once the zero power lighting control system 375 is active. Preferably, when the control circuit 377 is active, it disables the ability of the push button to control the latching relay 379. For example, by using a transistor circuit in series with the latching relay 379 "Close" input, the transistor circuit acts as an open switch until the control circuit 377 becomes active, causing the transistor to act as a closed switch. The control circuit 377 then monitors switch input and sends related signals to the load control circuit of the latching relay 379 and sensor circuit 381. In the fully off state, the zero power lighting control system 375 consumes no power. The sensor circuit 381 in further embodiments of the invention includes advanced processing capability, such as an ASIC or microcontroller, that allows additional functionality, such as zero crossing control for latching relays or implementing the various single button commands noted above.

Figure 4:
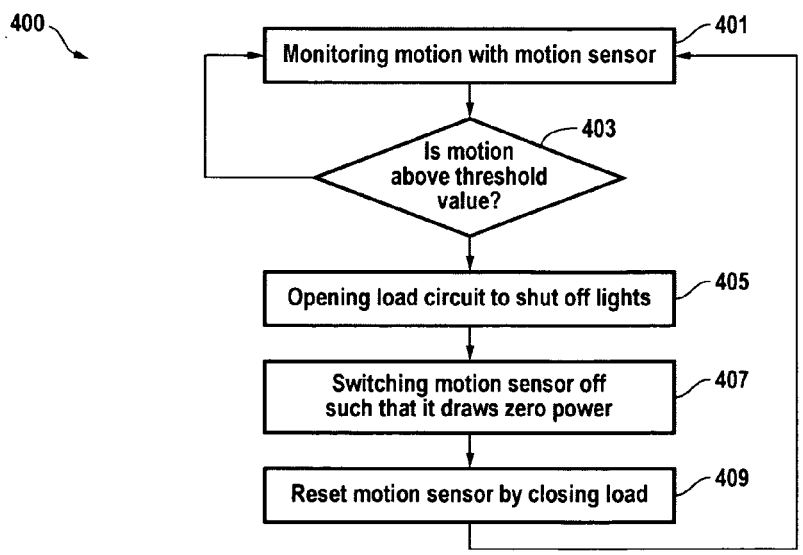
FIG. 4 shows block flow diagram outlining the steps, in accordance with the method of the invention.

FIG. 4 shows block flow diagram outlining the steps, in accordance with the method of the invention. In accordance with the method of the present invention a load circuit with lights is controlled by monitoring motion with a motion sensor unit within in a detection area of a work space. The motion sensor unit includes a motion sensor and sensor circuit, such as described above. The sensor circuit includes logic and/or firmware that verifies that the motion in the detection area of the work space is above a threshold value. When the motion detected within the work space is below a the threshold value, the load circuit is opened and the lights are shut off and the motion sensor unit draws zero current. After load circuit is opened and the lights are shut off, the load is closed and the motion sensor unit is powered on via a control circuit and switch device, such as described above.

Having fully described the preferred embodiments of the present invention, many other equivalent or alternative methods of implementing a zero power lighting control device or system will be apparent to those skilled in the art. For example, the motion sensor may be replaced by a daylight sensor. Additional relays may be added to control additional loads. The additional relays may be controlled by the ON/OFF switches or by the sensor circuit. In addition, both motion and daylight sensors may be controlled consistent with the present invention. Also, the motion sensor may provide separate relay outputs to control other devices such as HVAC controllers. The zero power lighting control system described, can include more complicated load control devices such as transistor circuits, triacs, dimming circuits and other controlled switching circuits.

What is claimed is:

1. A zero power lighting control system for electrically coupling to a load circuit, the zero power lighting control system comprising:
 a) a sensor unit for detecting motion and sending control signal to a load controller, wherein the load controller opens the load circuit when there is no motion detected by the sensor unit after a first time delay and the motion sensor unit powers down to draw zero current after a second time delay, such that the motion sensor unit is disabled and unable to detect motion;
 b) a separate switch device for closing the load controller; and
 c) a control circuit for powering the motion sensor unit "On" when the switch device is activated to close the load controller, such that the sensor unit is reenergized and capable of detecting motion.

2. The zero power lighting control system of claim 1, wherein the separate switch device is a manual momentary switch device.

3. The zero power lighting control system of claim 1, wherein the separate switch device is a motion sensor switch.

4. The zero power lighting control system of claim 1, wherein the sensor unit includes a motion sensor selected from the group consisting of an infrared motion sensor, and ultrasonic motion sensor and image motion sensor.

5. The zero power lighting control system of claim 1, further comprising a latching circuit in line with the control circuit and the sensor circuit.

6. The zero power lighting control system of claim 1, wherein the separate switch device includes a current limiting rectifier bridge and ganged-pairs of switches for providing "On" and "Off" functions.

7. The zero power lighting control system of claim 1, further comprising a user interface for selecting the first time delay when the load controller is opened after the motion detected by the sensor unit is below a threshold value.

8. The zero power lighting control system of claim 7, wherein the threshold value is selectable through the user interface.

9. A system for electrically coupling to a load circuit, the system comprising:
 a) at least one sensor unit for detecting motion, wherein the at least one sensor unit powers down to draw zero current when load circuits are opened after a zero power time delay, such that the at least one sensor unit is disabled;

b) a plurality of load controllers electrically coupled to the load circuits and the at least one sensor unit, wherein the at least one sensor unit instructs the plurality of load controllers to open the load circuits when motion detected by the at least one sensor unit is below a threshold value;

c) a separate switch device for opening and closing the plurality of load controllers; and d) a control circuit for powering the at least one motion sensor unit "On" when the switch device is activated to close the plurality of controllers and, wherein the at least one sensor unit is re-energized and is enabled to detect motion.

10. The system of claim 9, wherein the separate switch device is a manual momentary switch device.

11. The system of claim 9, wherein the separate switch device includes a motion sensor.

12. The system of claim 9, wherein the at least one sensor unit includes a motion sensor selected from the group consisting of an infrared motion sensor, an ultrasonic motion sensor, acoustic sensor and an image motion sensor.

13. The system of claim 9, further comprising a latching circuit in line with the control circuit and the sensor circuit.

14. The system of claim 9, wherein the separate switch device includes a current limiting rectifier bridge and ganged-pairs of switches for providing "On" and "Off" functions.

15. The system of claim 9, further comprising a user interface for selecting a load disabling time delay when the plurality of load controllers are opened after the motion detected by the sensor unit is below the threshold value.

16. The system of claim 15, wherein the load disabling time delay is selectable through the user interface.

17. A method for controlling lights, the method comprising:

a) monitoring motion with a motion sensor unit in a detection area;

b) verifying that the motion in the detection area is above a threshold value;

c) opening a load circuit to shut off the lights when the motion is not detected within the detection area after a first delay period and switching the motion sensor off to draw zero power after a second delay period, wherein the motion sensor is disabled; and d) resetting the motion sensor unit by closing the load with a separate switch device, wherein the motion sensor is energized and is enabled to detect motion through a control circuit electrically coupled to the switch device and the sensor unit.

18. The method of claim 17, wherein the separate switch device is a manual momentary switch device.

19. The method of claim 17, wherein the separate switch device is a motion sensor switch device.

20. The method of claim 17, wherein the separate switch device controls a latching relay to open and close the load circuit.

* * * * *